(12) United States Patent
Kotake

(10) Patent No.: US 12,286,068 B2
(45) Date of Patent: Apr. 29, 2025

(54) FRONT BUMPER

(71) Applicants: TOYOTA JIDOSHA KABUSHIKI KAISHA, Aichi-ken (JP); SUBARU CORPORATION, Tokyo (JP)

(72) Inventor: Shota Kotake, Toyota (JP)

(73) Assignees: TOYOTA JIDOSHA KABUSHIKI KAISHA, Aichi-ken (JP); SUBARU CORPORATION, Tokyo (JP)

(*) Notice: Subject to any disclaimer, the term of this patent is extended or adjusted under 35 U.S.C. 154(b) by 467 days.

(21) Appl. No.: 17/712,027

(22) Filed: Apr. 1, 2022

(65) Prior Publication Data
US 2022/0314910 A1 Oct. 6, 2022

(30) Foreign Application Priority Data

Apr. 5, 2021 (JP) ................. 2021-064102

(51) Int. Cl.
| | |
|---|---|
| B60R 19/48 | (2006.01) |
| B60R 19/12 | (2006.01) |
| B60R 19/18 | (2006.01) |
| B60R 19/52 | (2006.01) |
| B60R 21/34 | (2011.01) |

(52) U.S. Cl.
CPC .......... *B60R 19/483* (2013.01); *B60R 19/12* (2013.01); *B60R 19/18* (2013.01); *B60R 19/52* (2013.01); *B60R 21/34* (2013.01); *B60R 2019/1846* (2013.01); *B60R 2019/1886* (2013.01); *B60R 2019/527* (2013.01)

(58) Field of Classification Search
CPC ....... B60R 19/48; B60R 19/02; B60R 19/483; B60R 2019/527; B60R 2019/1886; B60R 2019/1846; B60R 21/34; B60R 19/52; B60R 19/18; B60R 19/12; B60R 19/023; G01S 7/02; G01S 13/931; G01S 7/027; G01S 2013/93271
USPC ................. 293/117, 120, 121, 155
See application file for complete search history.

(56) References Cited

U.S. PATENT DOCUMENTS

| | | | |
|---|---|---|---|
| 2004/0124643 A1 | 7/2004 | Matsumoto et al. | |
| 2007/0063133 A1 | 3/2007 | Furuya | |

(Continued)

FOREIGN PATENT DOCUMENTS

| | | |
|---|---|---|
| DE | 102005037151 A1 | 2/2007 |
| EP | 3581439 B1 | 9/2020 |

(Continued)

*Primary Examiner* — Dennis H Pedder
(74) *Attorney, Agent, or Firm* — HAUPTMAN HAM, LLP

(57) ABSTRACT

A front bumper includes a bumper body, a bumper inner, and a first electronic device. The bumper body is exposed to the outside of the vehicle. The bumper inner is located inside the bumper body and configured to fix the bumper body to a body of the vehicle. The first electronic device is located between the bumper body and the bumper inner. The bumper inner includes an inner body facing at least a part of the first electronic device in a first direction, and at least one columnar portion located adjacent to first the electronic device in a second direction perpendicular to the first direction, and extending in the first direction from the inner body toward the bumper body. The length in the first direction of the at least one columnar portion is greater than the length in the first direction of the first electronic device.

12 Claims, 4 Drawing Sheets

(56) References Cited

U.S. PATENT DOCUMENTS

| | | | |
|---|---|---|---|
| 2017/0129430 A1 | 5/2017 | Aizawa et al. | |
| 2019/0129430 A1 | 5/2019 | Madsen et al. | |
| 2020/0247307 A1* | 8/2020 | Tsutsumi | ............... B60R 11/04 |

FOREIGN PATENT DOCUMENTS

| | | | |
|---|---|---|---|
| JP | 2000-085497 | A | 3/2000 |
| JP | 2004203158 | A | 7/2004 |
| JP | 2007-085751 | A | 4/2007 |
| JP | 2010-260516 | A | 11/2010 |
| JP | 2015-063196 | A | 4/2015 |
| JP | 2015136947 | A | 7/2015 |
| JP | 201787942 | A | 5/2017 |
| JP | 2017215186 | A | 12/2017 |

\* cited by examiner

FRONT BUMPER

CROSS-REFERENCE TO RELATED APPLICATION

This application claims priority to Japanese Patent Application No. 2021-064102 filed on Apr. 5, 2021, incorporated herein by reference in its entirety.

BACKGROUND

1. Technical Field

The technique disclosed herein relates to a front bumper. Especially, the technique disclosed herein relates to a front bumper including an electronic device placed inside it.

2. Description of Related Art

Japanese Unexamined Patent Application Publication No. 2004-203158 (JP 2004-203158 A) discloses a front bumper including a bumper body (referred to as "bumper face" in JP 2004-203158 A) and a bumper inner (referred to as "reinforcing member" in JP 2004-203158 A). The bumper body is fixed to a body (e.g., undercover) via the bumper inner located over the lower part of the bumper body.

SUMMARY

An electronic device may be placed between the bumper body and the bumper inner. In that case, the space in which the electronic device is present is smaller than the space in which the electronic device is present in the case where the electronic device is placed between the bumper body and the body in a configuration in which the bumper body is directly fixed to the body. A load may be externally applied to the bumper body exposed to the outside of a vehicle. In a configuration in which an electronic device is placed between the bumper body and the bumper inner, when a load is externally applied to the bumper body and the bumper body is deformed inward, the electronic device is compressed between the bumper body and the bumper inner and the electronic device may be damaged. The present specification provides a front bumper capable of reducing damage to an electronic device when a load is applied to a bumper body from the outside of a vehicle.

A front bumper disclosed herein includes a bumper body, a bumper inner, and a first electronic device. The bumper body is exposed to outside of a vehicle. The bumper inner is located inside the bumper body and is configured to fix the bumper body to a body of the vehicle. The first electronic device is located between the bumper body and the bumper inner. The bumper inner includes an inner body facing at least a part of the first electronic device in a first direction, and at least one columnar portion located adjacent to the first electronic device in a second direction perpendicular to the first direction, and extending in the first direction from the inner body toward the bumper body. In the front bumper disclosed herein, a length in the first direction of the at least one columnar portion is greater than a length in the first direction of the first electronic device. The front bumper is configured to be mounted on a front part of the vehicle.

In the above front bumper, the first electronic device is located between the bumper body and the bumper inner, and the bumper inner faces at least a part of the first electronic device in the first direction. Therefore, the first electronic device may be damaged when a load is applied to the bumper body from the outside of the vehicle and the bumper body is displaced in the first direction. However, the columnar portion that is longer in the first direction than the first electronic device is located between the bumper body and the inner body and is adjacent to the first electronic device in the second direction perpendicular to the first direction. Accordingly, even when a load is applied to the bumper body from the outside of the vehicle and the bumper body is displaced in the first direction, the columnar portion can prohibit or reduce displacement of the bumper body (particularly, displacement of the bumper body relative to the bumper inner) before the first electronic device is compressed between the bumper body and the bumper inner. As described above, the front bumper disclosed herein can avoid or reduce damage to the first electronic device when a load is applied to the bumper body from the outside of the vehicle.

Details and further improvements of the technique disclosed herein will be described in the "DETAILED DESCRIPTION OF EMBODIMENTS" section below.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
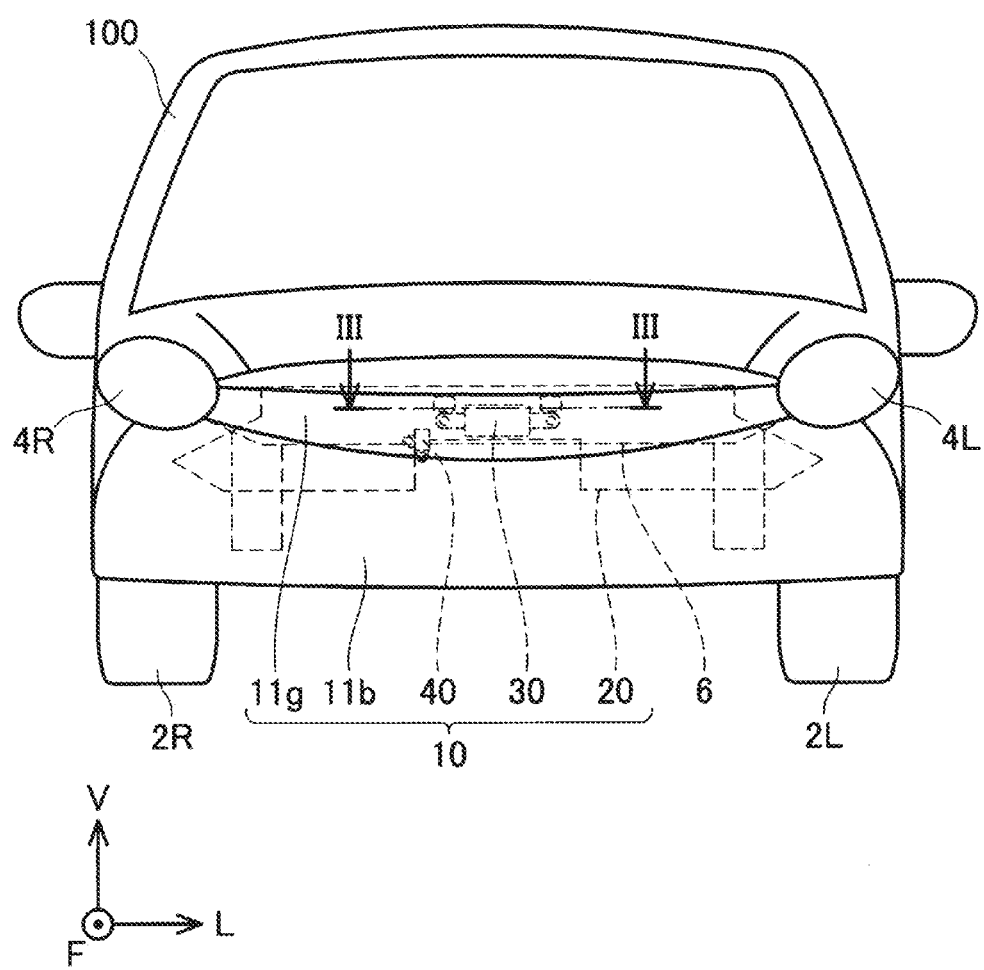
FIG. 1 is a front view of a vehicle 100 equipped with a front bumper 10 of an embodiment.

In one embodiment of the present technique, the first electronic device may be fixed to the bumper body. In that case, the first electronic device and the inner body may define a space between the first electronic device and the inner body in the first direction, and the at least one columnar portion may be adjacent to the space in the second direction. In another embodiment, the first electronic device may be fixed to the bumper inner. In that case, there may be a space between the first electronic device and the bumper body in the first direction.

In one embodiment of the present technique, the at least one columnar portion may include a pair of columnar portions arranged in the second direction. In that case, the first electronic device may be located between the pair of columnar portions. According to such a configuration, since a load applied to the bumper body is distributed to the columnar portions, displacement of the bumper body (particularly, displacement of the bumper body relative to the bumper inner) can be more reliably prohibited or reduced than in a configuration in which the bumper inner includes only one columnar portion.

In one embodiment of the present technique, the front bumper may further include a second electronic device located outside the pair of columnar portions. According to such a configuration, the columnar portions can reduce damage to the second electronic device in addition to the first electronic device. In another embodiment, the second electronic device may be located between the columnar portions.

In one embodiment of the present technique, the second electronic device may include a camera configured to capture an image of an area in front of the vehicle. In another embodiment, the second electronic device may include an antenna that receives radio waves for remote control of the vehicle.

In one embodiment of the present technique, the first electronic device may include a millimeter wave radar. In another embodiment, the first electronic device may include an antenna that receives radio waves for remote control of the vehicle.

In one embodiment of the present technique, the bumper body may include a base that protrudes toward the inner body. In that case, the at least one columnar portion may extend toward the base. The base protruding toward the inner body has relatively high rigidity as compared to other parts of the bumper body. According to such a configuration, since the columnar portion extends toward the base having high rigidity, rigidity around the first electronic device and/or the second electronic device is further increased. This configuration can further reduce damage to the first electronic device and/or the second electronic device than a configuration in which the bumper inner includes a columnar portion extending toward any other part of the bumper body.

In one embodiment of the present technique, the front bumper may further include a cover attached to the bumper body from outside and covering the base from the outside. This configuration can improve flexibility in shape of the base as the outside of the base of the bumper body is not exposed.

In one embodiment of the present technique, a tip end of the at least one columnar portion may be fixed to the base. According to such a configuration, since the columnar portion and the base are structurally integrated, the space between the bumper body and the inner body can be securely protected. This configuration can further reduce damage to the first electronic device and/or the second electronic device than a configuration in which the tip end of the columnar portion is not fixed to the base.

In one embodiment of the present technique, the first direction may be a longitudinal direction of the vehicle, and the second direction may be a lateral direction of the vehicle. In another embodiment, the first direction may be a vertical direction. In that case, the second direction may be the longitudinal direction or the lateral direction.

In one embodiment of the present technique, the bumper body may be configured to be fixed to the bumper inner, and the bumper inner may be configured to be fixed to the body of the vehicle.

A front bumper according to an embodiment will be described with reference to the drawings. First, a vehicle 100 equipped with a front bumper 10 of the embodiment will be described with reference to FIG. 1. In the following description, regarding the vertical direction of the vehicle 100, the upward direction (i.e. the direction of arrow V in the drawings) is sometimes simply referred to as "upper," and the opposite direction, namely the downward direction, is sometimes simply referred to as "lower." Regarding the lateral direction of the vehicle 100, the leftward direction as viewed from an occupant in a cabin of the vehicle 100 (that is, the direction of arrow L in the drawings) is sometimes simply referred to as "left," and the opposite direction is sometimes simply referred to as "right." Similarly, regarding the longitudinal direction of the vehicle 100, the forward direction (i.e. the direction of arrow F in the drawings) is sometimes simply referred to as "front," and the opposite direction, namely the rearward direction, is sometimes simply referred to as "rear."

FIG. 1 shows a front part of the vehicle 100. The vehicle 100 includes a pair of wheels 2R, 2L, a pair of headlights 4R, 4L, a body 6, and the front bumper 10. The vehicle 100 travels by driving the wheels 2R, 2L. The headlights 4R, 4L are lights that illuminate the road in front of the vehicle 100. The body 6 is a sheet metal component forming a structure that protects the cabin (not shown) of the vehicle 100.

The front bumper 10 is a so-called exterior component that is mounted on the front part of the vehicle 100, and is mainly made of resin. The front bumper 10 includes a bumper body 11b, a cover 11g, a bumper inner 20, a millimeter wave radar 30, and a camera 40. As described in detail later with reference to FIG. 2, the front bumper 10 is fixed to the body 6 of the vehicle 100 via the bumper inner 20. The bumper body 11b is a resin component exposed on the front part of the vehicle 100. The cover 11g is a resin component that is attached to the bumper body 11b from the outside (i.e., the side closer to the viewer of FIG. 1) to cover the bumper body 11b. The millimeter wave radar 30 is an electronic device for detecting an obstacle located in front of the vehicle 100. The camera 40 is an electronic device for capturing an image of the area in front of the vehicle 100. Since the detailed structures of the millimeter wave radar 30 and the camera 40 are known in the art, description thereof will be omitted.

The structure of the front bumper 10 will be described in detail with reference to FIG. 2. The bumper body 11b has in its upper part a fixing portion 13b extending in the lateral direction of the vehicle 100 (i.e., the horizontal direction of FIG. 2). The bumper body 11b has a base 13f in the middle part of the fixing portion 13b. The fixing portion 13b and the base 13f are seat surfaces on which structures such as a pair of bosses 16R, 16L and a pair of bosses 17R, 17L are located. First, the electronic devices (i.e., the millimeter wave radar 30 and the camera 40) are fixed to the base 13f of the fixing portion 13b. Next, the bumper inner 20 is fixed to the fixing portion 13b of the bumper body 11b.

The bumper inner 20 includes an inner body 20b, a pair of columnar portions 22R, 22L, a pair of bumper stays 24R, 24L, and a pair of through holes 26R, 26L. The inner body 20b extends in the lateral direction of the vehicle 100 and has a cut along the middle part of its lower edge. The columnar portions 22R, 22L extend forward from the inner body 20b toward the base 13f of the bumper body 11b. Each of the columnar portions 22R, 22L has a through hole at its tip end. Bolts 60 pass through the through holes of the columnar portions 22R, 22L of the bumper inner 20 and are screwed into the bosses 16R, 16L of the base 13f of the bumper body 11b. Similarly, bolts 60 pass through the through holes 26R, 26L of the inner body 20b and are screwed into the bosses 17R, 17L on the back surface of the fixing portion 13b of the bumper body 11b (i.e., the farther surface of the fixing portion 13b from the viewer of FIG. 2). The bumper inner 20 is thus fixed to the bumper body 11b by the bolts 60.

The cover 11g is then attached to the bumper body 11b from the front so as to cover the fixing portion 13b. Although not shown in the figures, the cover 11g is fixed by fitting resin clips, tabs, etc. into through holes of the fixing portion 13b. The front bumper 10 is thus completed.

Figure 2:
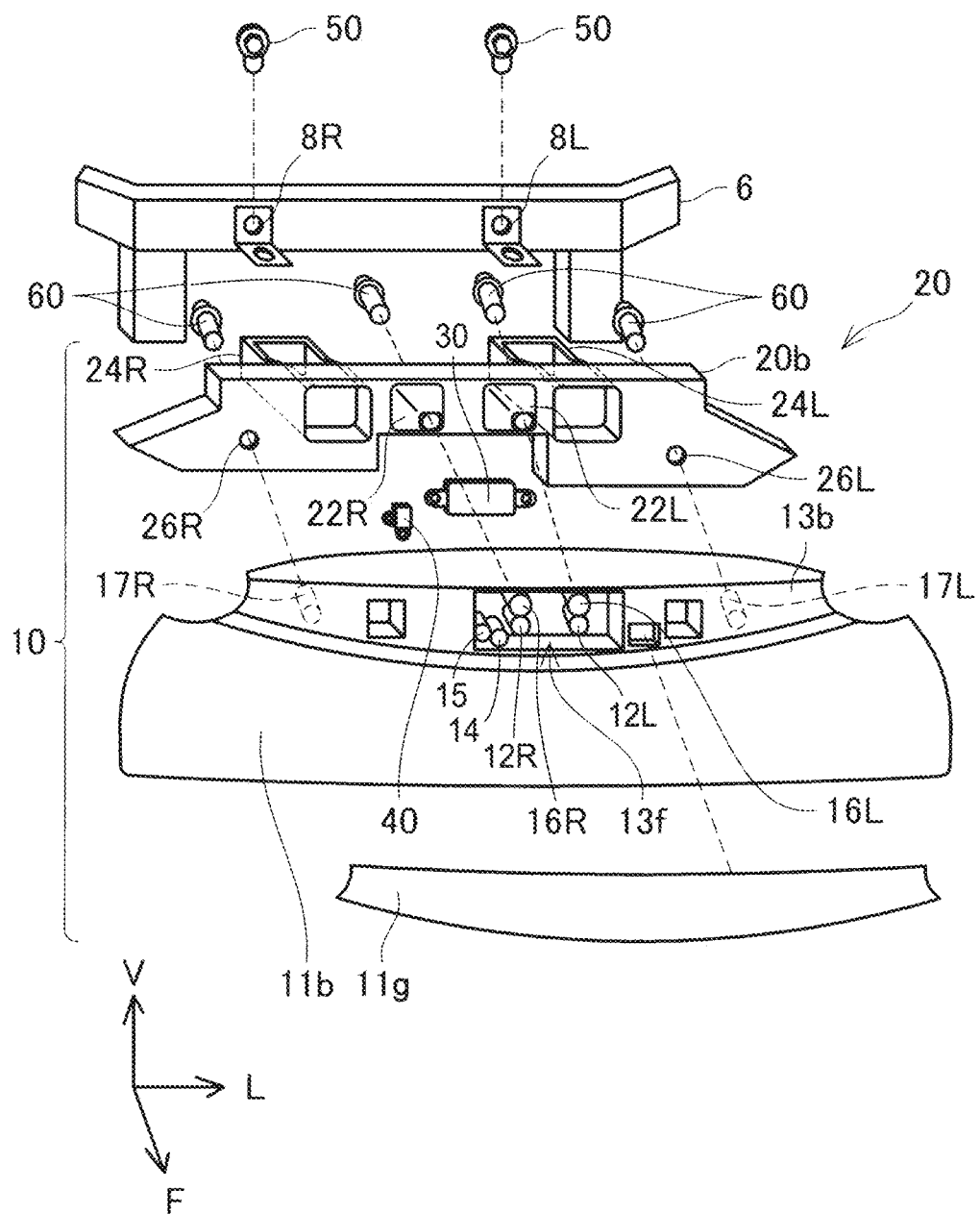
FIG. 2 is an exploded perspective view of the front bumper 10 of the embodiment.

As shown in FIG. 2, the body 6 of the vehicle 100 (see FIG. 1) includes a body portion extending in the lateral direction of the vehicle 100 and leg portions. The body 6 includes a pair of brackets 8R, 8L. The brackets 8R, 8L are welded to the body portion of the body 6. Each of the brackets 8R, 8L has a bottom surface extending forward toward the front bumper 10. The bottom surface of each bracket 8R, 8L has a through hole.

The bumper stays 24R, 24L of the inner body 20*b* are located so as to face the brackets 8R, 8L in the longitudinal direction of the vehicle 100, respectively. Specifically, the right bumper stay 24R located on the right side (i.e., the left side of FIG. 2) out of the bumper stays 24R, 24L faces the right bracket 8R located on the right side out of the brackets 8R, 8L in the longitudinal direction of the vehicle 100. Similarly, the left bumper stay 24L located on the left side (i.e., the right side of FIG. 2) faces the left bracket 8L located on the left side in the longitudinal direction of the vehicle 100.

The completed front bumper 10 is brought closer to the body 6 from the front (i.e., the side closer to the viewer of FIG. 2) so that the lower surfaces of the bumper stays 24R, 24L contact the bottom surfaces of the brackets 8R, 8L, respectively. The bumper stays 24R, 24L and the brackets 8R, 8L are then fastened together from above by bolts 50, respectively. Although not shown in the figures, the bumper inner 20 of the front bumper 10 of the embodiment is also fastened to the headlights 4R, 4L (see FIG. 1) at its both ends in the lateral direction of the vehicle 100. The front bumper 10 is thus mounted on the vehicle 100 via the bumper inner 20.

The detailed structure of the front bumper 10 around the electronic devices 30, 40 will be described with reference to FIG. 3 and FIG. 4. The left columnar portion 22L located on the left side (i.e., the right side of FIG. 3) out of the columnar portions 22R, 22L will be mainly described below. However, the right columnar portion 22R located on the right side also has a similar shape.

As described above, the bumper body 11*b* is fixed to the body 6 by the bumper inner 20. Accordingly, as shown in FIG. 3, the bumper inner 20 is located between the bumper body 11*b* and the body 6. The electronic devices 30, 40 are therefore located between the bumper inner 20 and the bumper body 11*b*. As a result, the inner body 20*b* of the bumper inner 20 faces the electronic devices 30, 40 in the longitudinal direction of the vehicle 100 (i.e., the vertical direction of FIG. 3).

As described above, the base 13*f* protruding toward the inner body 20*b* is provided in the middle part of the fixing portion 13*b* in the lateral direction of the vehicle 100. The base 13*f* is a seat surface to which the bumper inner 20 and the electronic devices 30, 40 are fixed. There is a plurality of beads 18 below the base 13*f* (i.e., on the farther side of the base 13*f* from the viewer of FIG. 3), so that the base 13*f* has higher rigidity than other parts of the bumper body 11*b*.

The millimeter wave radar 30 is fixed to the base 13*f* via a radar bracket 32. As shown in FIG. 4, the radar bracket 32 is fixed to the base 13*f* by a screw 56 that is screwed into a boss 12L of the base 13*f*. The radar bracket 32 has a laterally symmetrical shape. Accordingly, on the right side of the millimeter wave radar 30 (the farther side of the millimeter wave radar 30 from the viewer of FIG. 4) as well, the radar bracket 32 is fixed to the base 13*f* by a screw 56 that is screwed into a boss 12R of the base 13*f*.

Similarly, the camera 40 is also fixed to the base 13*f* via a camera bracket 54. More specifically, the camera 40 is fixed to the base 13*f* by passing screws 46 through through holes of the camera bracket 54 and screwing the screws 46 into bosses 14, 15 of base 13*f*. The columnar portions 22R, 22L of the bumper inner 20 are fixed to the base 13*f* by the bolts 60.

Figure 3:
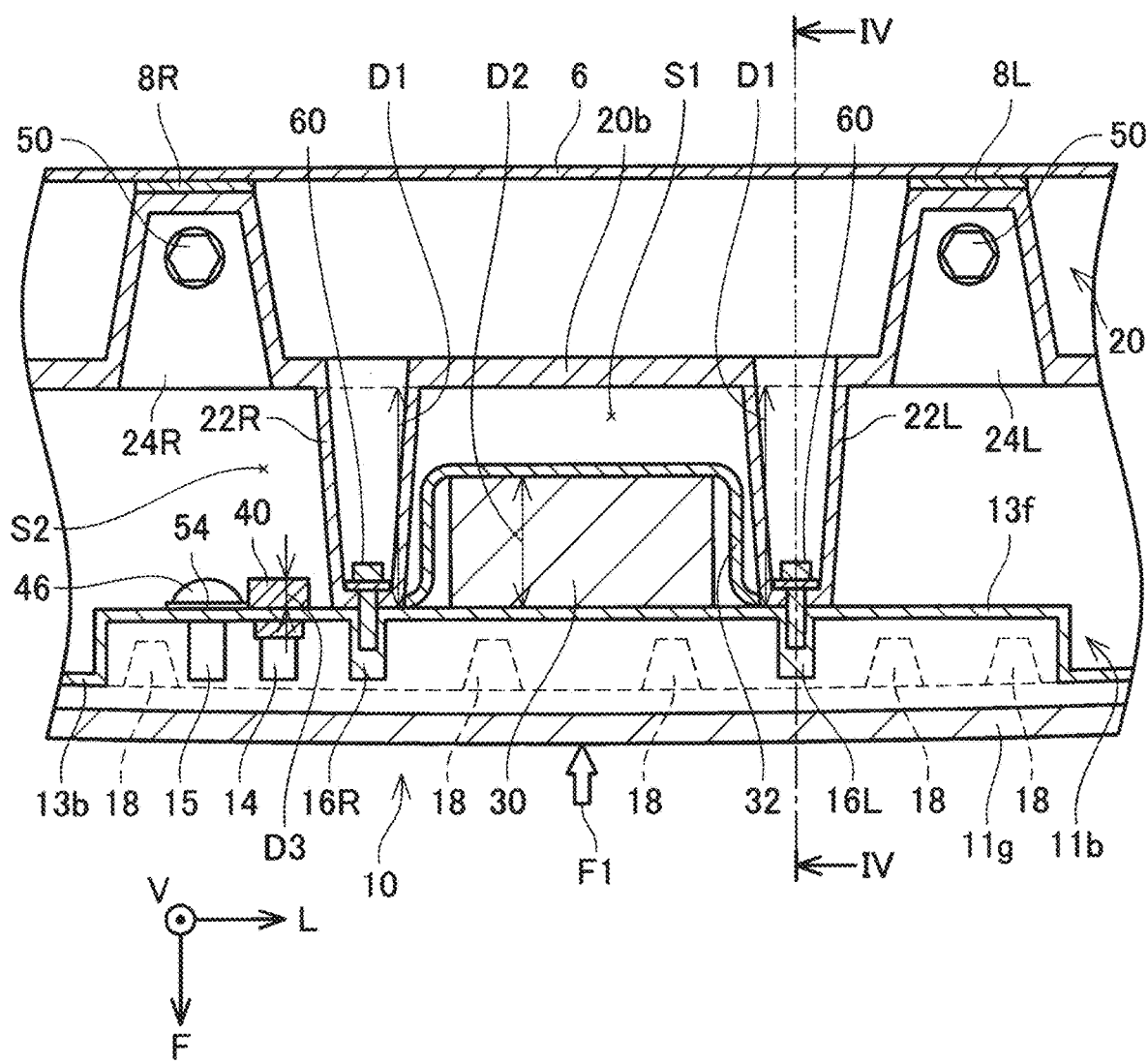
FIG. 3 is a sectional view taken along line in FIG. 1.

As shown in FIG. 3, since the inner body 20*b* of the bumper inner 20 is interposed between the bumper body 11*b* and the body 6, the space in which each electronic device 30, 40 is present is reduced in the longitudinal direction of the vehicle 100. In other words, the space behind each electronic device 30, 40 is reduced due to the inner body 20*b* being interposed between the bumper body 11*b* and the body 6.

The front bumper 10 is an exterior component and is exposed to the outside of the vehicle 100. Accordingly, for example, when the vehicle 100 has a frontal collision, a rearward load F1 is applied to the front surface of the front bumper 10. As described above, the bumper body 11*b* is made of resin. Therefore, when the load F1 is applied to the front surface of the front bumper 10, the base 13*f* of the bumper body 11*b* is displaced rearward. As a result, the electronic devices 30, 40 move toward the rear of the vehicle 100 (i.e., upward in FIG. 3) with the displacement of the base 13*f*.

As shown in FIG. 3, the left columnar portion 22L is adjacent to the millimeter wave radar 30 in the leftward direction (i.e., the rightward direction in FIG. 3). The length D1 of the left columnar portion 22L in the longitudinal direction of the vehicle 100 is greater than the length D2 of the millimeter wave radar 30 in the longitudinal direction of the vehicle 100. Accordingly, there is a space S1 between the millimeter wave radar 30 and the inner body 20*b* in the longitudinal direction of the vehicle 100. The left columnar portion 22L is also adjacent to the space S1 in the lateral direction of the vehicle 100.

Figure 4:
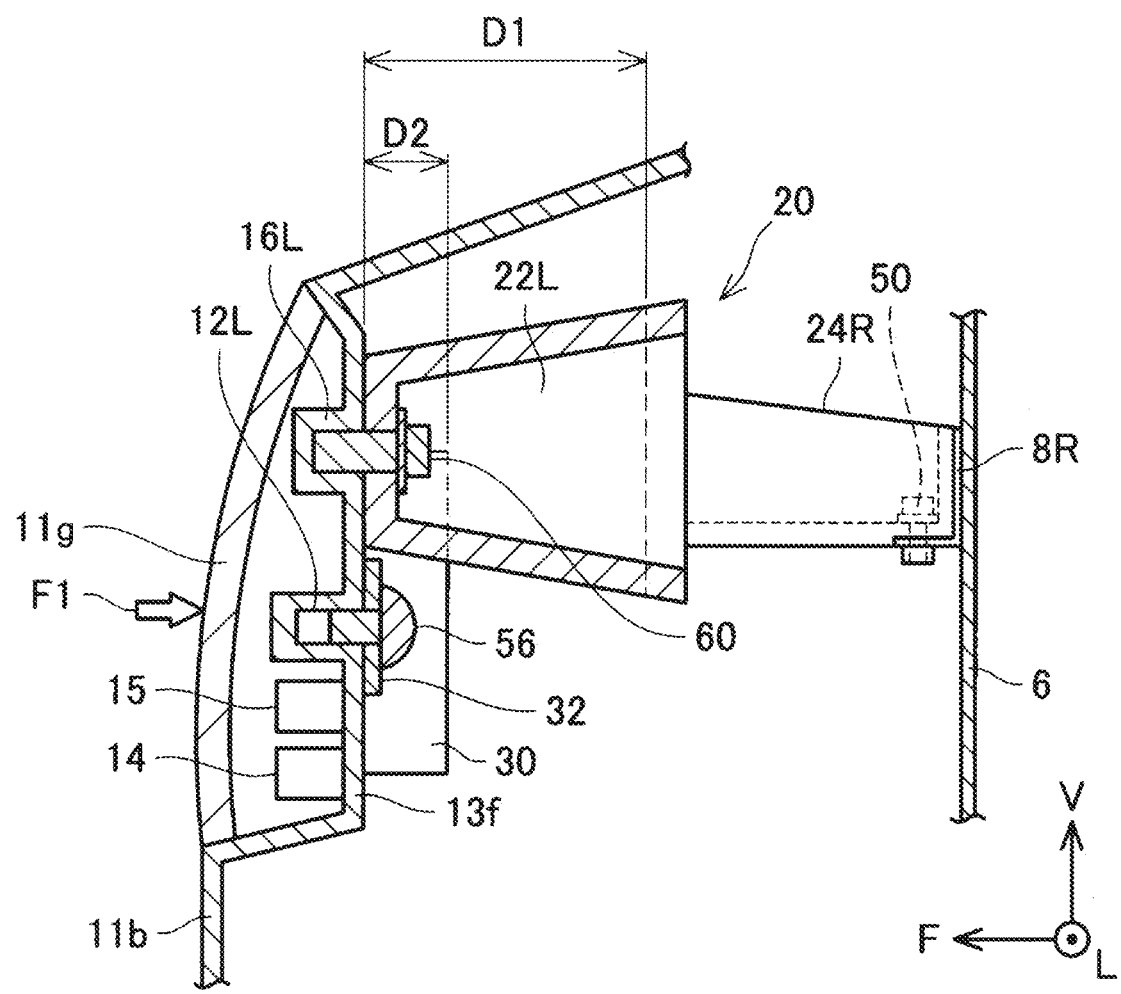
FIG. 4 is a sectional view taken along line IV-IV in FIG. 3.

Moreover, as shown in FIG. 3 and FIG. 4, the left columnar portion 22L has a box shape, and has side surfaces on its upper, lower, right, and left sides. Each side surface of the left columnar portion 22L extends in the longitudinal direction of the vehicle 100.

When the load F1 is applied to the front bumper 10 and the base 13*f* of the bumper body 11*b* is displaced rearward, the millimeter wave radar 30 moves into the space S1. At this time, the load F1 is transmitted to the left columnar portion 22L via the base 13*f* of the bumper body 11*b*. As described above, since each side surface of the left columnar portion 22L extends in the longitudinal direction of the vehicle 100, the rearward load F1 is transmitted as a compressive load to each side surface of the left columnar portion 22L. The left columnar portion 22L is less likely to be deformed in the longitudinal direction of the vehicle 100 by the load F1 than the base 13*f* to which the load F1 is transmitted as a bending load. In other words, even when the bumper body 11*b* is displaced by the load F1, the left columnar portion 22L can prohibit or reduce displacement of the base 13*f* (particularly, displacement of the base 13*f* relative to the inner body 20*b*) before the millimeter wave radar 30 is compressed between the base 13*f* of the bumper body 11*b* and the inner body 20*b* of the bumper inner 20.

As a result, the left columnar portion 22L maintains the space S1 for the millimeter wave radar 30 to exist even when the load F1 is applied to the front bumper 10. As described above, when the load F1 is applied to the front bumper 10 disclosed herein, the millimeter wave radar 30 can be displaced into the space S1 protected by the left columnar portion 22L. This configuration prevents or restrains the millimeter wave radar 30 from being compressed between the base 13*f* and the inner body 20*b*. As a result, the front bumper 10 can reduce damage to the millimeter wave radar 30.

In the front bumper 10, the millimeter wave radar 30 is located between the pair of columnar portions 22R, 22L, namely between the left columnar portion 22L and the right columnar portion 22R located to the right of the left columnar portion 22L. As described above, the right columnar portion 22R has a structure similar to that of the left columnar portion 22L. Accordingly, the space S1 is protected by the columnar portions 22R, 22L. The load F1 is distributed to the columnar portions 22R, 22L. This configuration can further reduce damage to the millimeter wave radar 30 than a configuration in which the bumper inner 20 has only the left columnar portion 22L.

As shown in FIG. 3 and FIG. 4, the front tip end of the left columnar portion 22L abuts on the rear surface of the base 13f. That is, the left columnar portion 22L extends toward the base 13f. As described above, since the base 13f protrudes toward the inner body 20b and is reinforced by the beads 18, the base 13f has higher rigidity than other parts of the bumper body 11b. Since the left columnar portion 22L extends toward the base 13f with high rigidity, the rigidity around the millimeter wave radar 30 can be increased. This configuration can further reduce damage to the millimeter wave radar 30.

The front tip end of the left columnar portion 22L is fixed to the base 13f by the bolt 60. The left columnar portion 22L and the base 13f are therefore structurally integrated. Specifically, the front tip end (i.e., the tip end located on the lower side in FIG. 3) of the left columnar portion 22L is prevented from being displaced on the rear surface of the base 13f in the lateral direction of the vehicle 100 or the vertical direction of the vehicle 100 (i.e., the direction from the side closer to the viewer of FIG. 3 to the side away from the viewer or vise versa). This configuration can more securely protect the space S1 than a configuration in which the front tip end of the left columnar portion 22L is not fixed to the base 13f. That is, this configuration can further reduce damage to the millimeter wave radar 30.

As shown in FIG. 3, the camera 40 is located outside the columnar portions 22R, 22L. The right columnar portion 22R is adjacent to the camera 40 in the leftward direction (i.e., the rightward direction in FIG. 3). The length D1 of the right columnar portion 22R is greater than the length D3 of the camera 40 in the longitudinal direction of the vehicle 100. Therefore, like the millimeter-wave radar 30, there is a space S2 between the camera 40 and the inner body 20b in the longitudinal direction of the vehicle 100. This configuration can reduce damage to the camera 40 when the load F1 is applied to the front bumper 10.

As described above, the cover 11g is attached to the fixing portion 13b of the bumper body 11b from the outside of the vehicle 100 (see FIG. 1). As shown in FIG. 3 and FIG. 4, the cover 11g covers the base 13f of the fixing portion 13b from the outside. A plurality of bosses is provided on the outside of the base 13f. Since the cover 11g covers the base 13f from the outside, the bosses are not exposed to the outside. This configuration can improve flexibility in shape of the base 13f to which the electronic devices 30, 40 and the bumper inner 20 are fixed.

While the embodiment is described in detail above, the embodiment is merely illustrative, and is not intended to limit the scope of the claims. The technique defined in the claims includes various modifications and alterations of the specific example described above. Modifications of the above embodiment will be described below.

First Modification

In the above front bumper 10, the electronic devices 30, 40 are fixed to the base 13f of the bumper body 11b. In this modification, the electronic devices 30, 40 may be fixed to the inner body 20b of the bumper inner 20. In that case, the spaces S1, S2 are located between the bumper body 11b and the electronic devices 30, 40.

Second Modification

The above front bumper 10 includes the columnar portions 22R, 22L adjacent to the millimeter wave radar 30 on both sides in the lateral direction of the vehicle 100. In this modification, the inner body 20b may alternatively have only the right columnar portion 22R.

Third Modification

In the above front bumper 10, the columnar portions 22R, 22L are arranged in the lateral direction of the vehicle 100. In this modification, for example, the columnar portions 22R, 22L may be arranged in the vertical direction of the vehicle 100. In a further modification, a series of columnar portions provided so as to cover the peripheral edge of the millimeter wave radar 30 as viewed in the longitudinal direction of the vehicle 100 may extend forward toward the bumper body 11b.

Fourth Modification

In this modification, for example, an antenna that receives signals for remote control of the vehicle 100 may be disposed between the bumper body 11b and the inner body 20b, instead of the millimeter wave radar 30.

Fifth Modification

The front bumper 10 may not include the camera 40. That is, the second electronic device may be omitted in this modification.

Sixth Modification

The bumper body 11b may not include the base 13f. In that case, the millimeter wave radar 30 may be directly fixed to the back surface of the bumper body 11b.

Seventh Modification

The front bumper 10 may not include the cover 11g. In that case, the millimeter wave radar 30 may be directly fixed to the back surface of a part of the bumper body 11b that is exposed to the outside.

Eighth Modification

The front tip ends of the columnar portions 22R, 22L may not be fixed to the base 13f.

Ninth Modification

In the front bumper 10 of the embodiment, the columnar portions 22R, 22L extend in the longitudinal direction of the vehicle 100. In this modification, the columnar portions 22R, 22L may extend in the vertical direction of the vehicle 100. Alternatively, the columnar portions 22R, 22L may be tilted so as to be displaced upward toward the front.

While specific examples of the present disclosure are described in detail above, these examples are merely illustrative, and are not intended to limit the scope of the claims. The technique defined in the claims includes various modifications and alterations of the specific examples described above. The technical elements illustrated in the present specification or the drawings have technical utility alone or in various combinations, and are not limited to the combinations described in the claims as originally filed. The technique illustrated in the present specification or the drawings may achieve a plurality of objects at the same time, and has technical utility by achieving one of the objects.

What is claimed is:

1. A front bumper, comprising:
   a bumper body exposed to outside of a vehicle;
   a bumper inner located inside the bumper body and configured to fix the bumper body to a body of the vehicle;
   a bolt fixing the bumper body to the bumper inner; and a first electronic device located between the bumper body and the bumper inner, wherein:
the bumper inner includes
an inner body facing at least a part of the first electronic device in a first direction, and
at least one columnar portion located adjacent to the first electronic device in a second direction perpendicular to the first direction, and extending in the first direction from the inner body toward the bumper body,
a length in the first direction of the at least one columnar portion is greater than a length in the first direction of the first electronic device,
the front bumper is configured to be mounted on a front part of the vehicle,
the bumper body includes a base protruding toward the inner body, wherein the base includes a boss receiving the bolt along the first direction,
the at least one columnar portion includes a tip end facing the base along the first direction, wherein the tip end includes a through hole corresponding to the boss, and
the bolt extends in the first direction, through the through hole, to fix the base to the at least one columnar portion.

2. The front bumper according to claim 1, wherein:
the first electronic device is fixed to the bumper body;
the first electronic device and the inner body define a space between the first electronic device and the inner body in the first direction; and
the at least one columnar portion is adjacent to the space in the second direction.

3. The front bumper according to claim 1, wherein:
the at least one columnar portion includes a pair of columnar portions arranged in the second direction; and
the first electronic device is located between the pair of columnar portions.

4. The front bumper according to claim 3, further comprising:
a second electronic device located outside the pair of columnar portions.

5. The front bumper according to claim 4, wherein
the second electronic device includes a camera configured to capture an image of an area in front of the vehicle.

6. The front bumper according to claim 1, wherein
the first electronic device includes a millimeter wave radar.

7. The front bumper according to claim 1, further comprising:
a cover attached to the bumper body from the outside of the vehicle and covering the base from the outside.

8. The front bumper according to claim 1, wherein:
the first direction is a longitudinal direction of the vehicle; and
the second direction is a lateral direction of the vehicle.

9. The front bumper according to claim 1, wherein:
the bumper inner is configured to be fixed to the body of the vehicle.

10. The front bumper according to claim 1, wherein
the base protruding toward the inner body has a rigidity higher than that of remaining parts of the bumper body.

11. The front bumper according to claim 1, further comprising:
a plurality of beads below the base, wherein the base reinforced by the plurality of beads has a rigidity higher than remaining parts of the bumper body.

12. The front bumper according to claim 6, wherein
a portion of the base around the millimeter wave radar has a rigidity higher than that of remaining parts of the bumper body.

* * * * *